United States Patent [19]
Ebbinghaus

[11] Patent Number: 6,032,768
[45] Date of Patent: Mar. 7, 2000

[54] ARRANGEMENT OF A BRAKE DISC ON A WHEEL HUB

[75] Inventor: Wilfried Ebbinghaus, Wiehl, Germany

[73] Assignee: BPW Bergische Achsen KG, Germany

[21] Appl. No.: 08/993,347

[22] Filed: Dec. 18, 1997

[30] Foreign Application Priority Data

Dec. 18, 1996 [DE] Germany .............................. 196 52 694

[51] Int. Cl.$^7$ .................................................. F16D 55/00
[52] U.S. Cl. ..................................... 188/73.31; 188/73.32; 188/218 XL; 188/370; 192/70.13; 301/9.1
[58] Field of Search ............................... 188/73.31, 73.32, 188/18 A, 218 XL, 370; 29/402.03, 402.08, 426.1; 192/70.13; 301/9.1, 6.8

[56] References Cited

U.S. PATENT DOCUMENTS

| | | | |
|---|---|---|---|
| 3,780,834 | 12/1973 | Lottridge et al. | 188/18 A |
| 3,978,945 | 9/1976 | Gardner et al. | 188/218 X |
| 4,049,085 | 9/1977 | Blunier | 188/18 A |

FOREIGN PATENT DOCUMENTS 3605806  9/1987  Germany .

*Primary Examiner*—Mark T. Le
*Assistant Examiner*—Pamela J. Lipka
*Attorney, Agent, or Firm*—Robert W. Becker & Associates

[57] ABSTRACT

A method for changing a brake disk of a disk brake, wherein the brake disk includes a friction ring and a brake disk hub for connecting the brake disk to a wheel hub that is rotatably connected to a steering knuckle and has a wheel flange for detachably connecting a wheel, wherein a brake saddle support has two brake pads with pad supports connected thereto, wherein the brake pads cooperate with the friction ring, and wherein the brake saddle support is connected to a fastening flange of the axial body, includes a first step of removing the wheel hub from the steering knuckle by separating the wheel hub from the brake disk hub of the position-secured brake disk. The brake pads and the brake pad supports are then removed from the brake saddle support. The brake disk is then released and lowered onto the steering knuckle. The end of the brake disk opposite the brake saddle support is tilted toward the free end of the steering knuckle. The brake disk is removed from the brake saddle support of the steering knuckle.

10 Claims, 9 Drawing Sheets

ARRANGEMENT OF A BRAKE DISC ON A WHEEL HUB

BACKGROUND OF THE INVENTION

The present invention relates to a method for changing the brake disk of a disk brake, especially for trucks and commercial vehicles, having brake disks comprised of a friction ring and a brake disk hub. The brake disk is fastened by the brake disk hub to a wheel hub that is rotatably supported on a steering knuckle. The wheel hub comprises a wheel flange for detachably connecting a wheel thereto. The brake disk cooperates in the area of its friction rings with two brake pads which are arranged together with their brake pad supports in a receiving chamber of a brake saddle support. The brake saddle support is connected to a fastening flange of the axial body and supports the actuating device of the disk brake. The invention also relates to a brake disk to be used in connection with the inventive method.

In known disk brakes, the brake disk hub of the brake disk has an extension in the direction toward the wheel flange of the wheel hub and is embodied with a radially projecting fastening flange by which the brake disk is detachably connected with wheel bolts or with separate fastening bolts to the wheel flange of the wheel hub. This has the disadvantage that for changing the brake pads, the wheel or, in the case of twin wheels, both wheels must be demounted in order to allow access to the brake pads. In addition to these complicated steps for changing the brake pads, the known construction also has the disadvantage that the cup-shaped embodiment of the brake disk hub with connected fastening flange results in a great material accumulation at one side of the brake disk which, upon heating of the brake disk during braking, causes a one-sided thermal umbrella-shaped deformation of the brake disk.

Since not only the brake pads but also the brake disks are subject to wear, the brake disks must also be replaced at certain intervals. For such a brake disk change, after removal of the brake pads in the aforementioned manner, the wheel bolts respectively, the fastening bolts must also be removed and all screws which secure the brake saddle support at the fastening flange of the axial body must be loosened so that the brake saddle support with the entire brake can be removed or can be pivoted about a loosened screw. While the wheel bolts or fastening bolts can be relatively easily removed, it is difficult to remove or loosen the screws that attach the brake saddle support at the fastening flange of the axial body because due to the constant exposure to heat they are usually frozen. For brake disk temperatures of up to 900° C., the fastening screws are subjected to temperatures of up to 500° C.

It is therefore an object of the present invention to facilitate changing of the brake pads and to allow for replacement of the brake disk without having to remove the brake saddle support.

SUMMARY OF THE INVENTION

A method for changing a brake disk of a disk brake, wherein the brake disk is comprised of a friction ring and a brake disk hub for connecting the brake disk to a wheel hub that is rotatably connected to a steering knuckle and has a wheel flange for detachably connecting a wheel, wherein the brake saddle support has two brake pads with pad supports connected thereto, wherein the brake pads cooperate with the friction ring, and wherein the brake saddle support is connected to a fastening flange of the axial body, the following inventive steps are suggested:

removing the wheel hub from the steering knuckle by separating the wheel hub from the brake disk hub of the position-secured brake disk;

removing the brake pads and the brake pad supports from the brake saddle support;

releasing the brake disk and lowering the brake disk onto the steering knuckle;

tilting an end of the brake disk opposite the brake saddle support toward the free end of the steering knuckle;

removing the brake disk from the brake saddle support and pulling the brake disk off the steering knuckle.

Advantageously, in the step of removing the wheel hub from the steering knuckle, a wheel mounted on the wheel flange is removed together with the wheel hub.

The present invention also relates to a disk brake arrangement to be used in connection with the inventive method.

The brake disk arrangement according to the present invention is primarily characterized by:

a brake disk comprised of a friction ring and a brake disk hub for connecting the brake disk to a wheel hub that is rotatably connected to a steering knuckle and has a wheel flange for detachably connecting a wheel;

a brake saddle support having two brake pads with pad supports connected thereto;

the brake pads cooperating with the friction ring;

the brake saddle support connected to a fastening flange of an axle body;

the friction ring having a radial width and an axial thickness matching a radial spacing between the steering knuckle and a forward end of the brake saddle support facing the wheel flange and matching an axial spacing between forward and rearward ends of the brake saddle support in order to allow lowering the brake disk onto the steering knuckle, tilting the end of the brake disk opposite the brake saddle support toward the free end of the steering knuckle, removing the brake disk from the brake saddle support and pulling the brake disk off the steering knuckle.

Advantageously, the brake saddle support comprises two flanges and the brake saddle support is attached by the two flanges to a fastening flange of the axle body. The brake saddle support further comprises a front and a rear connecting stays connecting the two flanges. The front and rear connecting stays form a receiving chamber for the brake pad supports, wherein the rear connecting stay has a centrally arranged, axially recessed portion facing the brake disk.

The recessed portion is formed by an arc-shaped cutout or by a stepped cutout.

The front connecting stay is preferably narrower and higher than the rear connecting stay.

A radial spacing of the front connecting stay to the steering knuckle is preferably greater than the radial spacing of the rear connecting stay to the steering knuckle.

At least one end face of the friction ring has a circumferential recess or a circumferential slanted portion extending at least over a portion of the circumference of the friction ring.

Expediently, the brake disk hub has axial projections and axial recesses for interlocking the brake disk hub at a neck of the wheel hub in order to provide a rotationally fixed connection.

Preferably, the brake disk hub has an axial extension facing the wheel flange of the wheel hub.

According to the present invention, the wheel hub is separated from the brake disk hub, while the brake disk is secured in its position, and is then removed from the steering knuckle. Subsequently, the brake pads with their brake pad supports are removed from the receiving chamber of the brake saddle support and, subsequently, the securing of the brake disk in its position is released, the brake disk lowered in a direction toward the steering knuckle, and the side of the brake disk opposite the brake saddle support is tilted in a direction toward the free end of the steering knuckle. Now it is possible to remove the brake disk from the brake saddle support and pull it off the steering knuckle.

With the present invention, it is possible to change brake pads in a simple manner since the wheel hub can be removed from the steering knuckle by separating it from the brake disk hub, with the brake disk in a secured position, and furthermore, the brake disk, after removal of the brake pads from the receiving chamber of the brake saddle support, can also be changed in a simple manner by releasing the position-securing action at the brake disk and lowering it in the direction toward the steering knuckle. The side of the brake disk opposite the brake saddle support is then tilted in the direction of the free end of the steering knuckle so that subsequently the brake disk can be removed from the brake saddle support and pulled off the steering knuckle. This eliminates loosing of the screws that secure the brake saddle support at the fastening flange of the axial body and also eliminates demounting or pivoting of the brake saddle support so that the steps required for brake disk change are considerably simplified.

According to a further feature of the invention, the wheel hub can be removed together with the wheel mounted on the wheel flange from the steering knuckle.

A brake disk that is suitable for performing the inventive method is characterized in that the dimensions with regard to height and axial thickness of the friction ring of the brake disk and, on the other hand, of the radial spacing between the steering knuckle and the forward portion of the brake saddle support adjacent to the wheel flange as well as the axial spacing between the forward and the rear end of the brake saddle support are matched to one another.

In a brake saddle support having two flanges for fastening it to the fastening flange of the axle body and having a forward and a rear connecting stay between these flanges, whereby between the connecting stays the receiving chamber for the brake pad supports is provided, according to a further feature of the invention the rear connecting stay has a centrally arranged recessed portion facing the brake disk. This recessed portion can be arc-shaped or can be stepped. Furthermore, the front connecting stay can be narrower and higher than the rear connecting stay in order to facilitate removal of the brake disk from the brake saddle support.

In a preferred embodiment of the invention, the radial distance of the front connecting stay to the steering knuckle is greater than that of the rear connecting stay to the steering knuckle.

According to a further feature of the invention the friction ring of the brake disk can be provided at least over a portion of its circumference at least at one end face with a circumferential recess or circumferential slants in order to facilitate mounting or demounting of the brake disk by providing additional play or free space.

In order to be able to remove the wheel hub, preferably together with the wheel connected thereto, from the steering knuckle after securing the brake disk in its position, the brake disk hub is provided with axially extending projections and/or depressions for connecting it in a non-rotational manner to the neck of the wheel hub. This embodiment eliminates the prior art design of having an axial extension of the brake disk hub ending in a radially projecting fastening flange which causes a one-sided material accumulation and thus a one-sided thermal loading of the brake disk.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
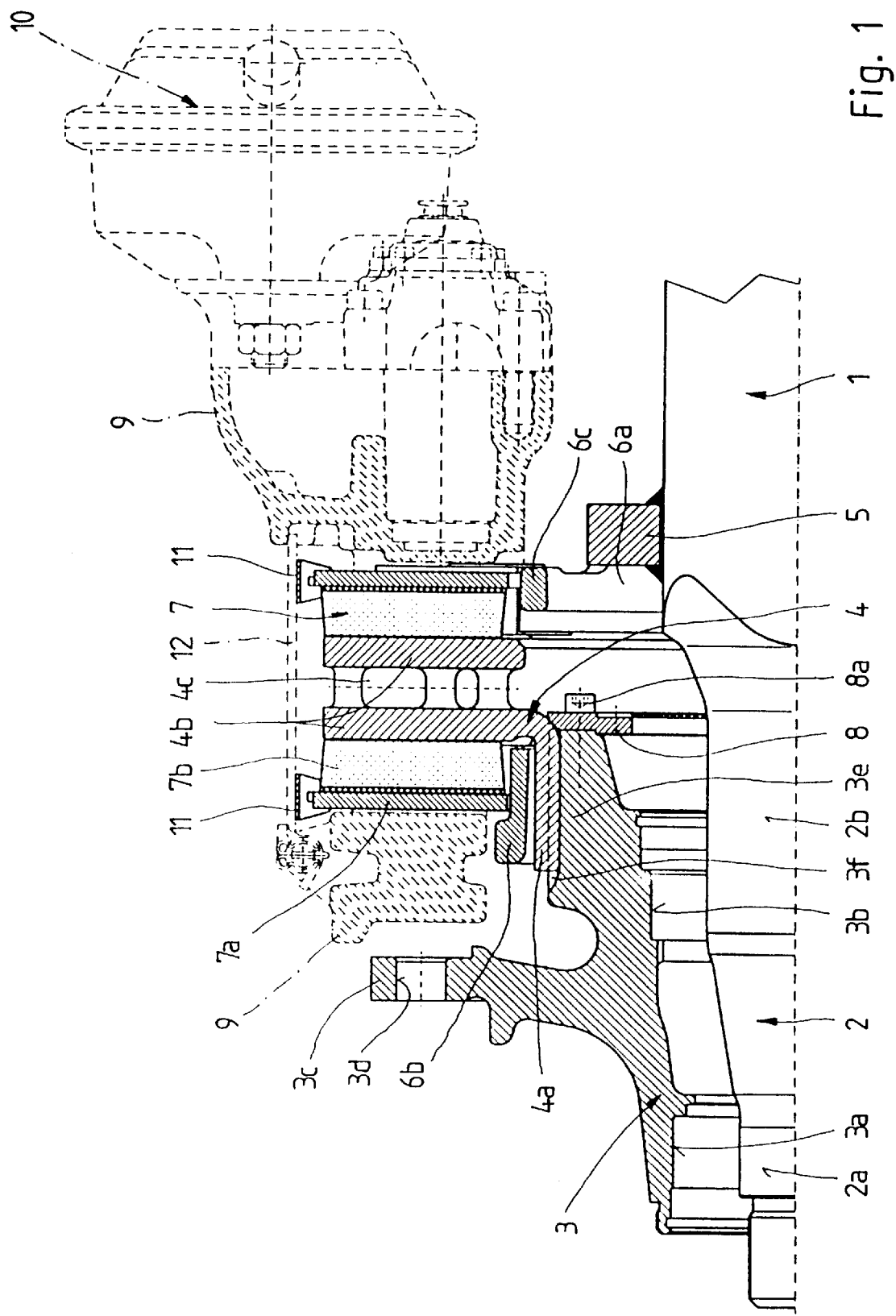
FIG. 1 shows a longitudinal section of the upper half of a disk brake in the operational state.

The present invention will now be described in detail with the aid of several specific embodiments utilizing FIGS. 1 through 9.

The representations of an embodiment of a disk brake show a portion of the axle body 1 having at its ends a respective steering knuckle 2. This steering knuckle 2 is embodied with two bearing seats 2a and 2b for the inner ring of tapered roller bearings. For facilitating illustration, these bearings are not represented in the drawing. These roller bearings provide for a rotatable support of the wheel hub 3 on the steering knuckle 2 whereby the wheel hub 3 is provided with bearing seats 3a and 3b for the outer rings of the respective roller bearing. Furthermore, the wheel hub 3 comprises of wheel flange 3c for detachably connecting a wheel (not represented in the drawing) thereto by wheel bolts. The bores 3d for receiving the rear bolts within the wheel flange 3c can be seen in the drawings.

The neck portion 3e of the wheel hub which extends in the direction toward the axle body 1 has axially extending depressions 3f for connecting the brake disk 4 in a non-rotatable but axial detachable manner to the wheel hub 3. The brake disk 4 comprises a brake disk hub 4a having projections 4d corresponding to the axial depressions 3f of the neck portion 3e of the wheel hub 3 (see FIG. 6). Furthermore, the brake disk 3 comprises a friction ring 4b provided in the shown embodiment with a cooling air channel 4c. In order to provide for a detachable securing of the brake disk 4 connected in a non-rotatable manner to the wheel hub 3 by the depressions 3f and projections 4d, a securing ring 8 is provided which can be mounted by screws 8a onto the end face of the wheel hub neck portion 3e (see FIG. 1). The securing ring 8 can also be embodied as a pole wheel for an anti-lock brake system.

The fastening flange 5 for the brake saddle support 6 is arranged at the axial body 1 and provides receiving chambers for receiving two brake pads 7. Each brake pad 7 is comprised of a brake pad support 7a and the actual pad material 7b.

Figure 8:
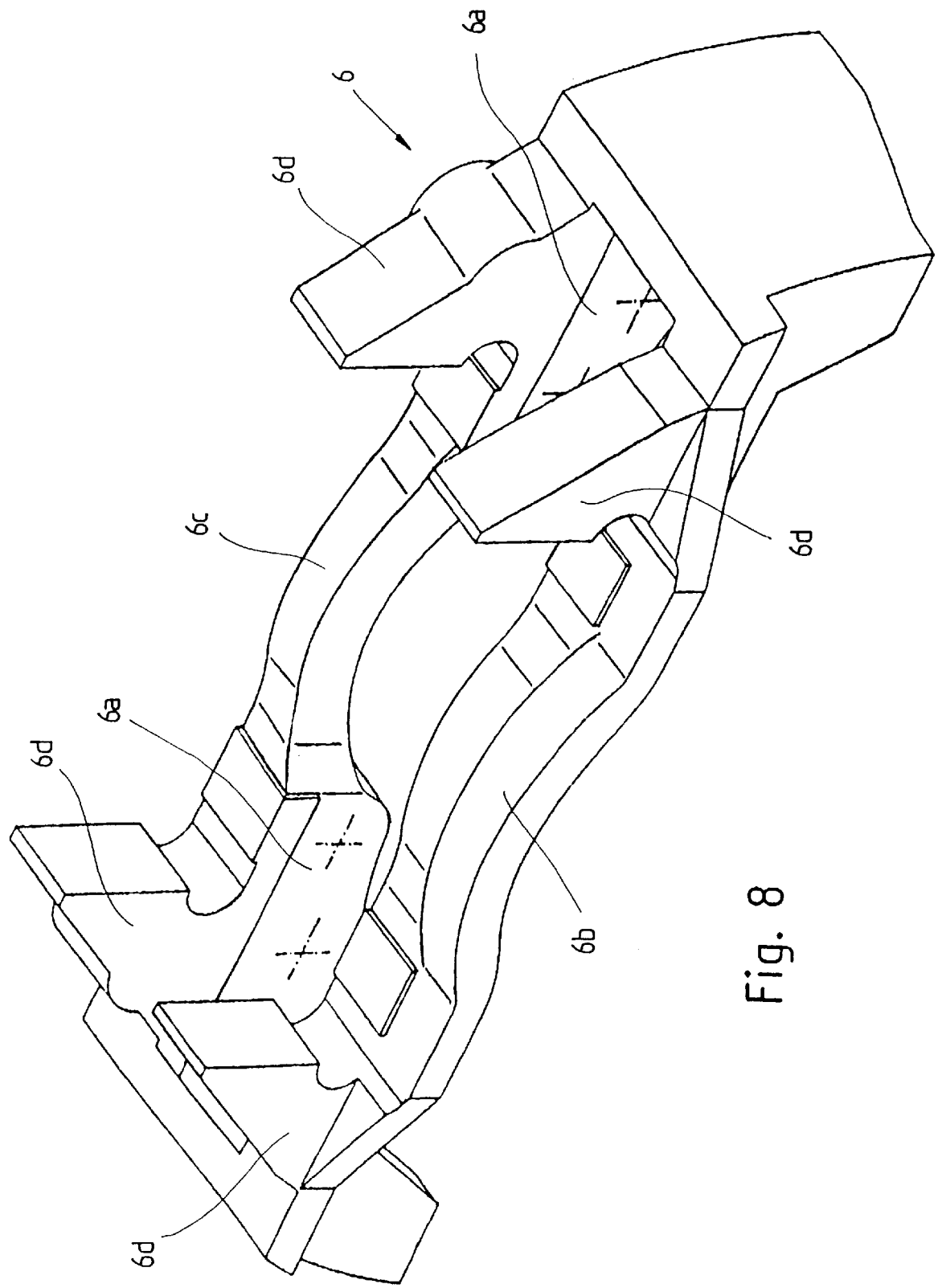
FIG. 8 a perspective view of the brake saddle support.

The brake saddle support 6 is represented perspectively in FIG. 8. This representation shows that the brake saddle support 6 has two flanges 6a which can be connected by screws to the fastening flange 5 which is itself welded to the axial body 1. In the shown embodiment, the connection of the brake saddle supports 6 to the fastening flange 5 is provided by three screws on each side. This is shown schematically in FIGS. 7 and 8. The brake saddle support 6 comprises furthermore a front connecting stay 6b and a rear connecting stay 6c which extend between the two flanges 6a. Between them the receiving chamber for the friction ring 4b of the brake disk 4 is defined. The upper side of the connecting stays 6b and 6c serves as an abutment surface for the brake pads 7 which in the tangential direction of the brake saddle support 6 are guided by paired radially outwardly projecting abutments 6d.

FIGS. 1 through 5 show for completeness of the drawings in a dash-dotted line a brake saddle 9 in longitudinal section which is guided in a floating manner within a frame and thus is moveable relative to the brake saddle support 6. The brake force to be applied by the brake saddle 9 onto the two brake pads 7 is produced by the piston of a brake cylinder 10 also indicated in dash-dotted lines in a schematic manner. The brake force of the brake cylinder piston is directly applied onto the inwardly arranged brake pad 7 and indirectly applied via the brake saddle 9 onto the exterior brake pad 7. In order to safely secure the brake pads 7 within the receiving chamber of the brake saddle support 6, each brake pad 7 has coordinated therewith a securing spring 11 which, as shown in FIG. 6, is placed onto the respective brake pad support 7a of the brake pad 7. Both securing springs 11 are loaded and fixed in their position by the securing bracket 12 provided at the brake saddle 9 in their respective ready position. This situation is best shown in FIG. 1.

Figure 2:
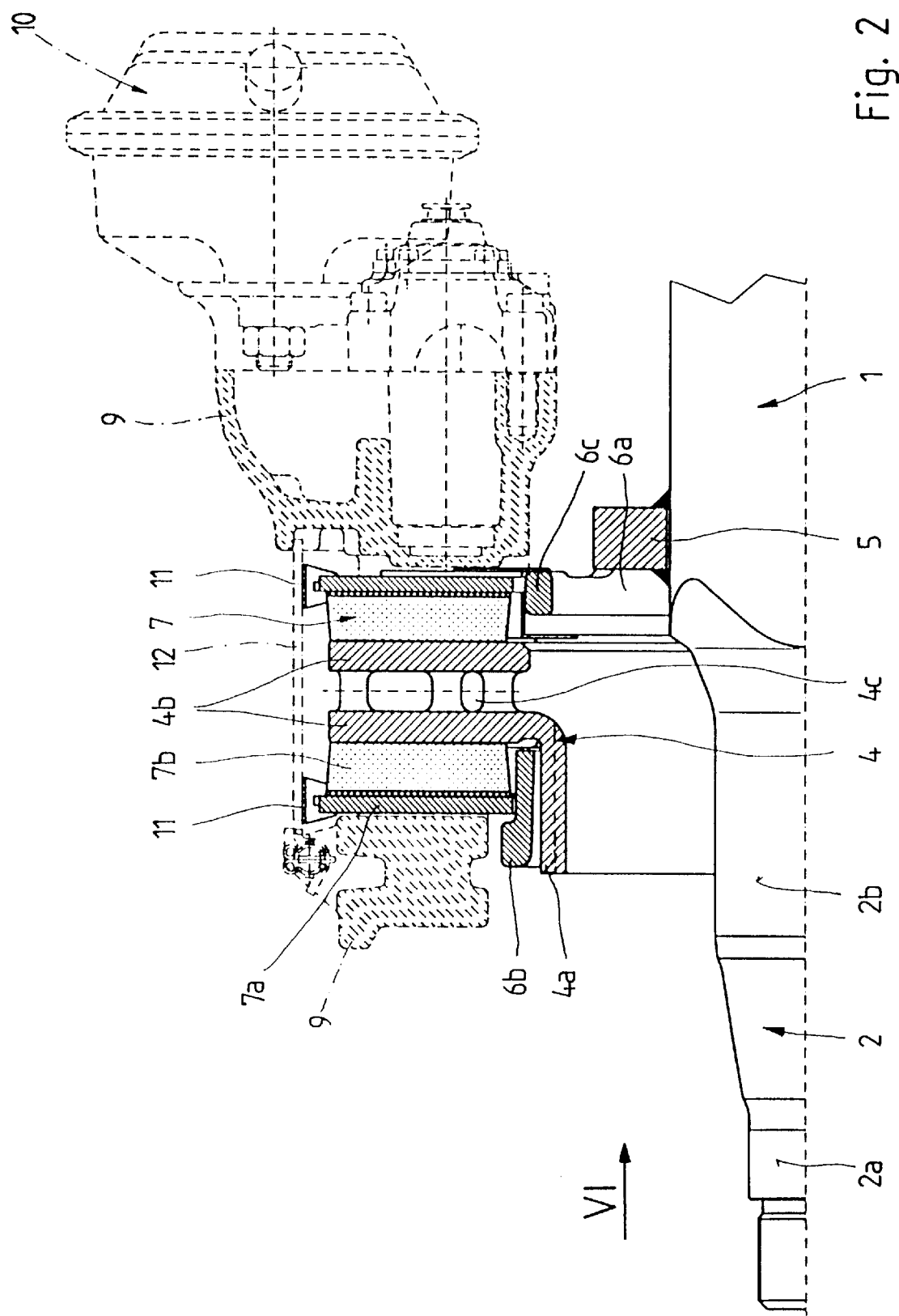
FIG. 2 shows a longitudinal section in accordance with FIG. 1 after removal of the wheel hub from the steering knuckle.

FIGS. 1 through 5 show the five method steps changing the brake disk 4, whereby FIG. 1 shows the normal operational state of the disk brake. In order to change the brake disk 4 without demounting the brake saddle support 6, according to FIG. 2 the complete wheel hub 3 is removed from the steering knuckle 2 in a first step. For this purpose it is first necessary to loosen the securing ring 8 by removing the screws 8a from the neck portion 3e of the wheel hub. Subsequently, the complete wheel hub 3 together with the non-represented roller bearings and seals as well as the non-represented wheel can be removed by the axle nut from the steering knuckle 2, whereby the depressions 3f provided in the shown embodiment at the neck portion 3e glide axially away from the projections 4d provided at the brake disk hub 4a. The brake disk 4 is secured in a suitable manner in the position represented in FIG. 1. After removal of the hub 3, the state of the disk brake represented in FIG. 2 is reached.

After pivoting of the securing bracket 12, the brake pads 7 are now upwardly removed from the receiving chamber of the brake saddle support 6 defined by the abutments 6d in the respective connecting stay 6b or 6c.

Figure 3:
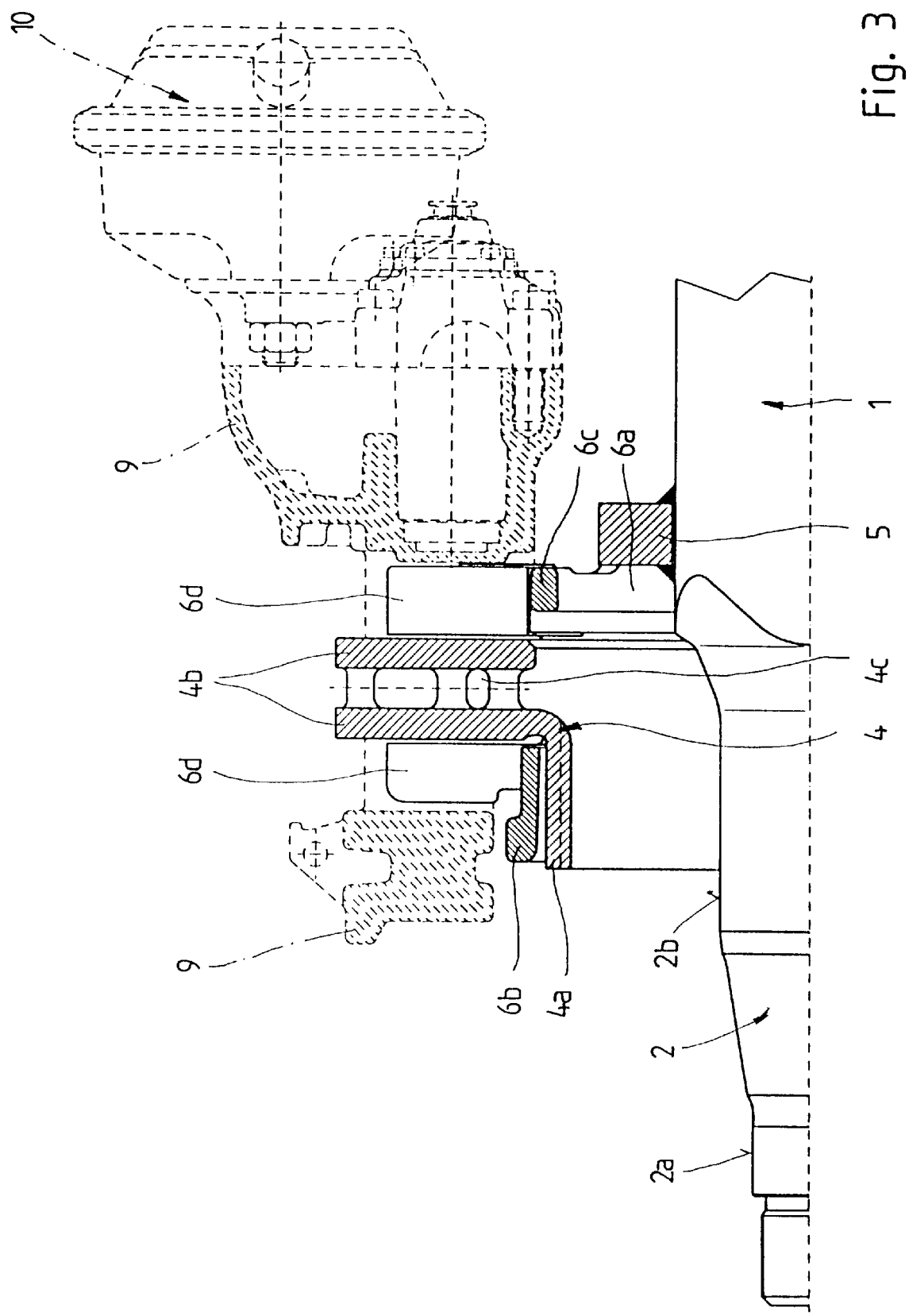
FIG. 3 shows a further longitudinal section according to FIG. 1 and 2 after removal of the brake pads.

The resulting situation is represented in FIG. 3.

Figure 4:
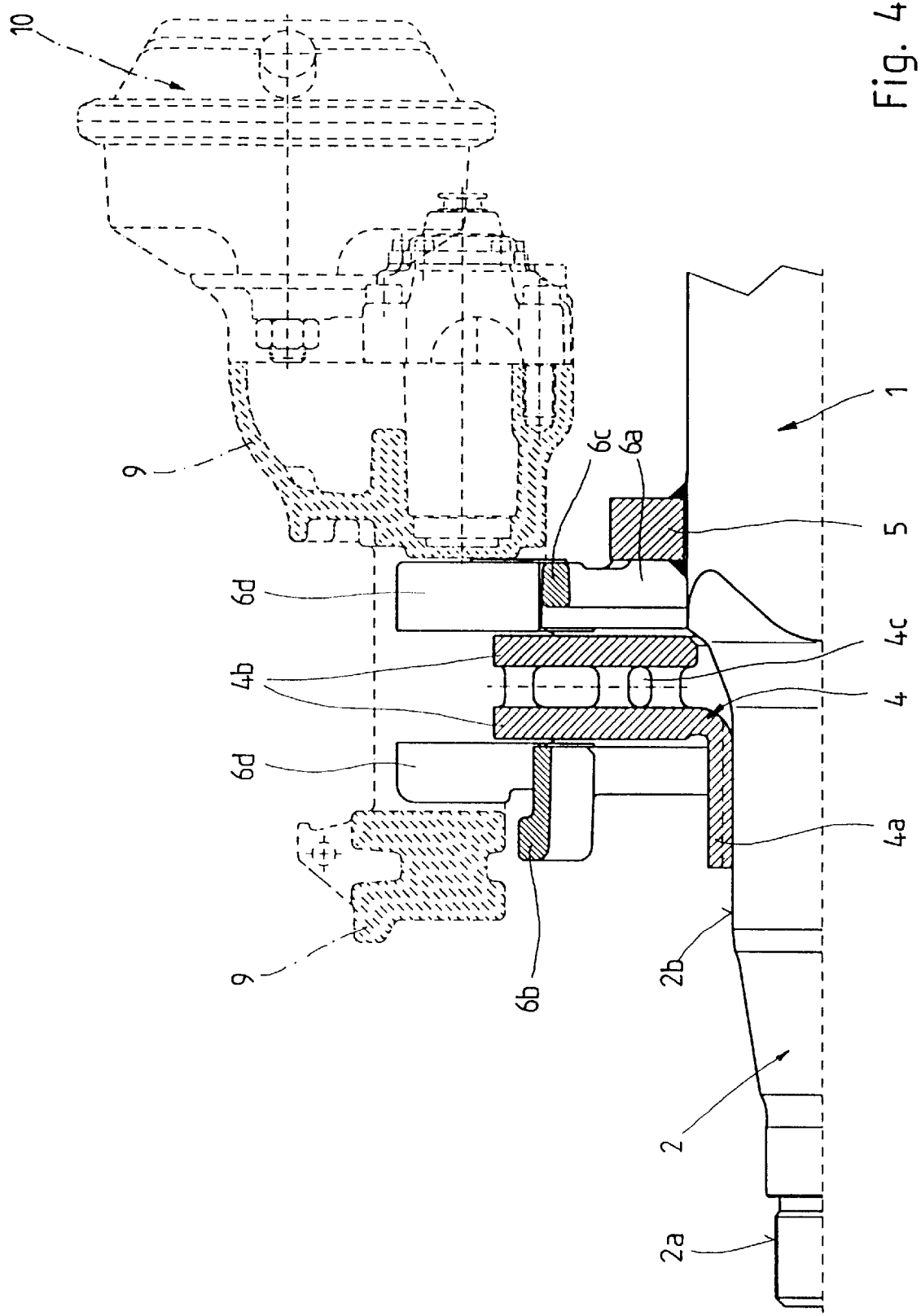
FIG. 4 shows a further longitudinal section after release of the positioning securing action at the brake disk and lowering of the brake disk onto the steering knuckle.

According to FIG. 4, the position-securing of the brake disk 4 is now released and the brake disk 4 is lowered onto the steering knuckle 2, as shown in the drawing. By doing so, the brake disk 4 with its upper part of the friction ring 4b is now positioned between the two connecting stays 6b and 6c of the brake saddle support 6 while the brake disk hub 4a is contacting the bearing seat 2b of the steering knuckle 2, as can be clearly seen in FIG. 4.

Figure 5:
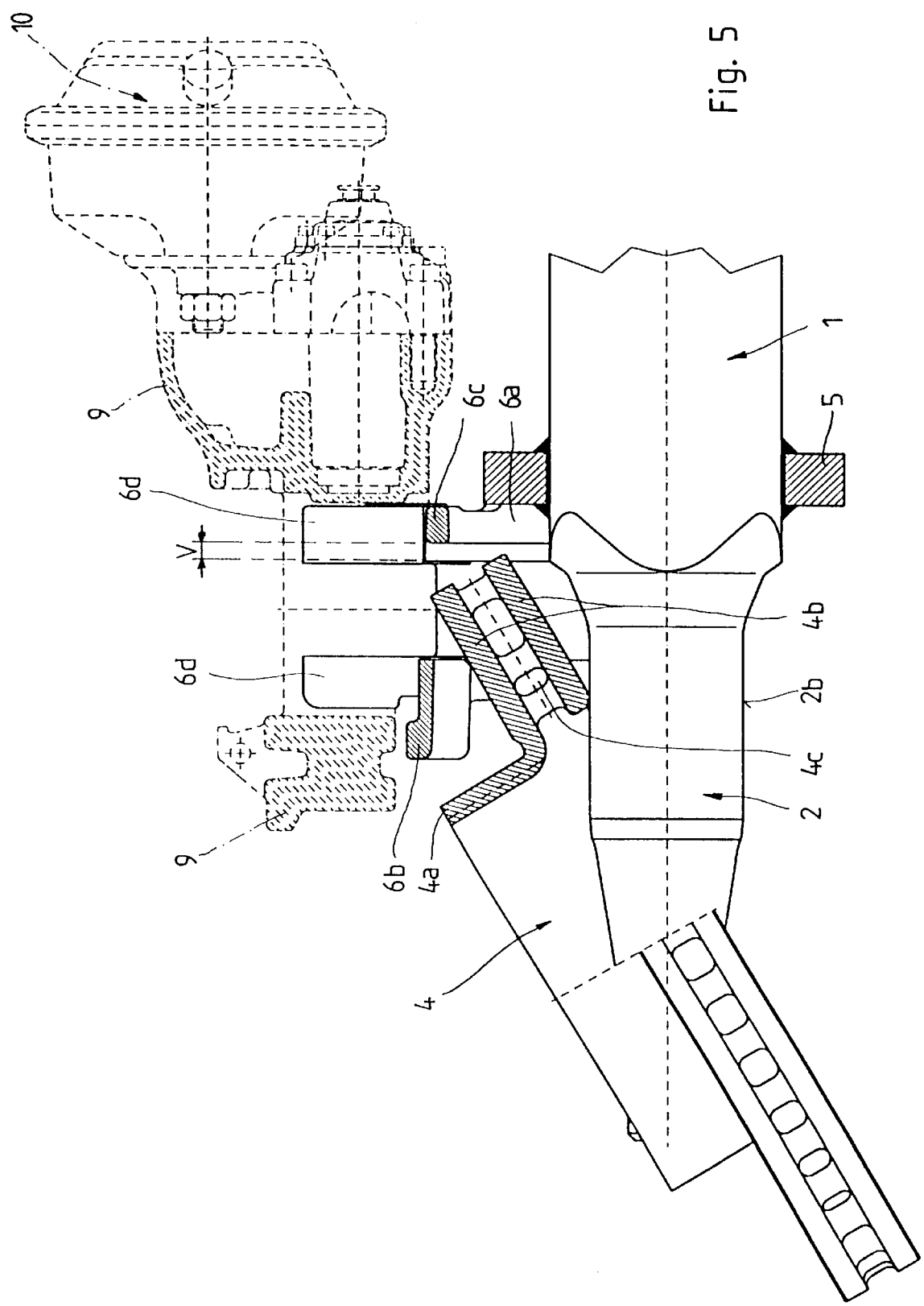
FIG. 5 shows a longitudinal section corresponding to the proceeding illustrations with forwardly tilted brake disk that has been moved partly out of the brake saddle support.
Figure 6:
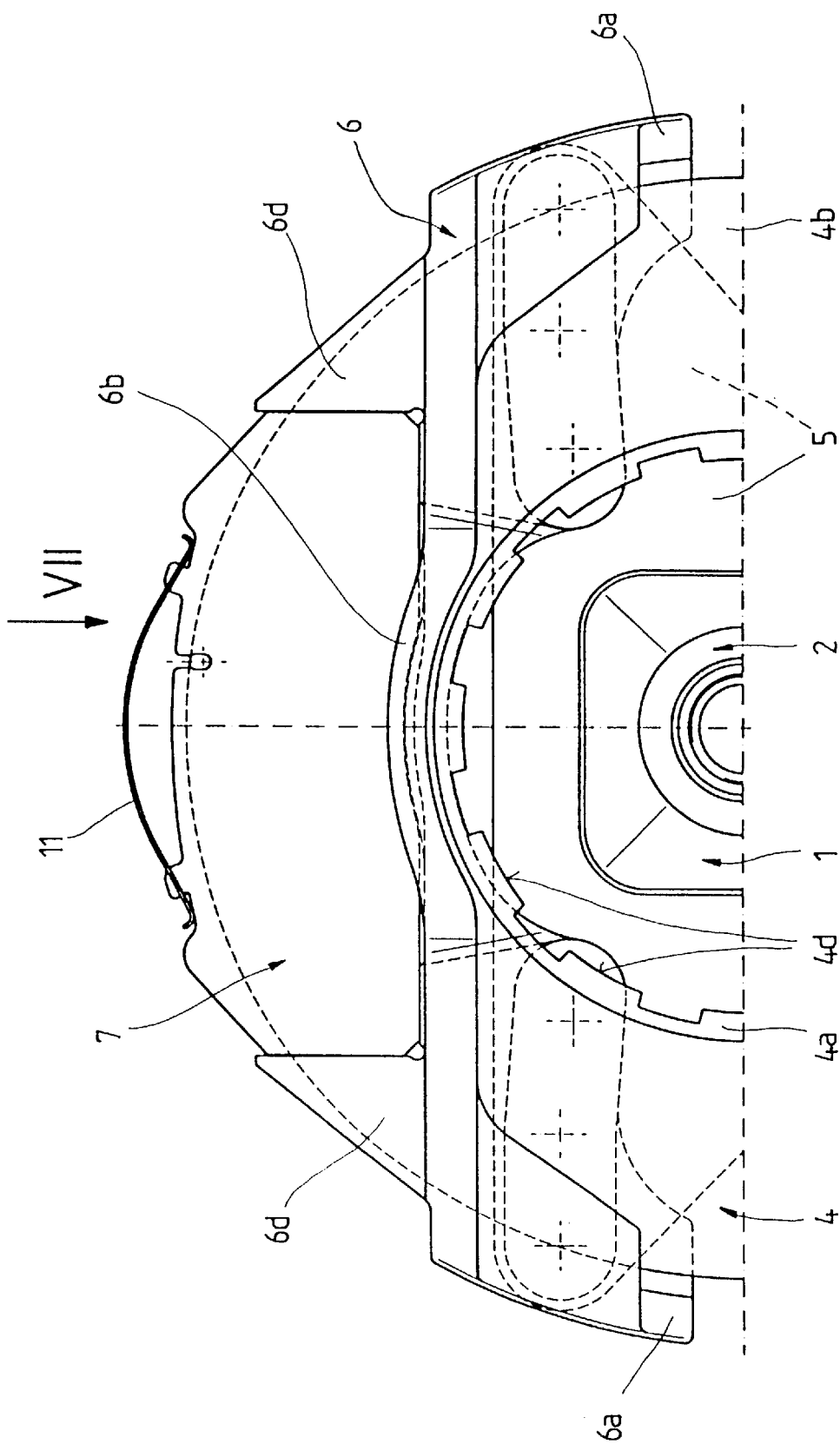
FIG. 6 a front view according to arrow VI of FIG. 2.
Figure 7:
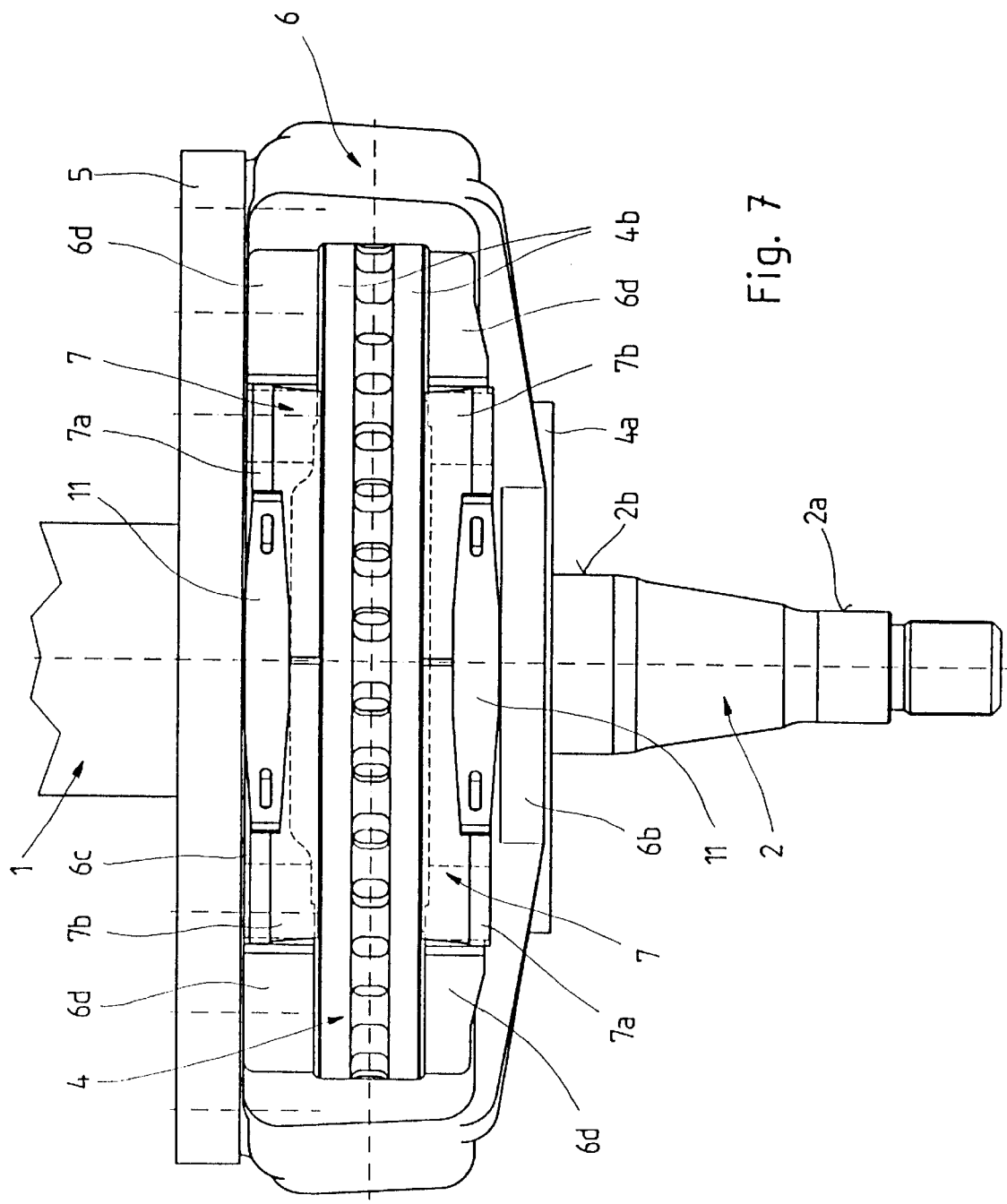
FIG. 7 a plan view according to arrow VII of FIG. 6.

Since the dimensions of the height and the axial thickness of the friction ring 4b of the brake disk 4 and, on the other hand, the radial spacing between the steering knuckle 2 and the forward portion of the brake saddle support 6 facing the wheel flange 3c as well as the axial spacing between the forward and rearward portion of the brake saddle support 6 are matched to one another, the brake disk 4 can now be pivoted according to FIG. 5 with its lower half opposite the brake saddle support 6 in the direction toward the free end of the steering knuckle 2 and subsequently, it can be removed from the brake saddle support 6 and pulled off the steering knuckle 2.

The mounting of a new brake disk 4 is then performed in the reverse sequence of steps.

In order to facilitate removal of the brake disk 4 from the brake saddles support 6, respectively, to facilitate the introduction of a new brake disk 4 into the brake saddle support 6, the rear connecting stay 6c is recessed in its central portion in the axial direction away from the brake disk 4. The depth V of this recess is shown in FIG. 5. The recess depth V of the rear connecting stay 6c can be provided by an arc-shaped recess and/or by a stepped recess. Finally, the represented embodiment shows that the front connecting stay 6b is narrower but also higher than the rear connecting stay 6c so that the removal or insertion of the brake disk 4 into the brake saddle support 6 is further facilitated. For this purpose, the radial spacing of the front connecting stay 6b of the brake saddle support 6 from the steering knuckle 2 is greater than that of the rear connecting stay 6c. These features are especially well illustrated in the perspective representation of FIG. 8.

Figure 9:
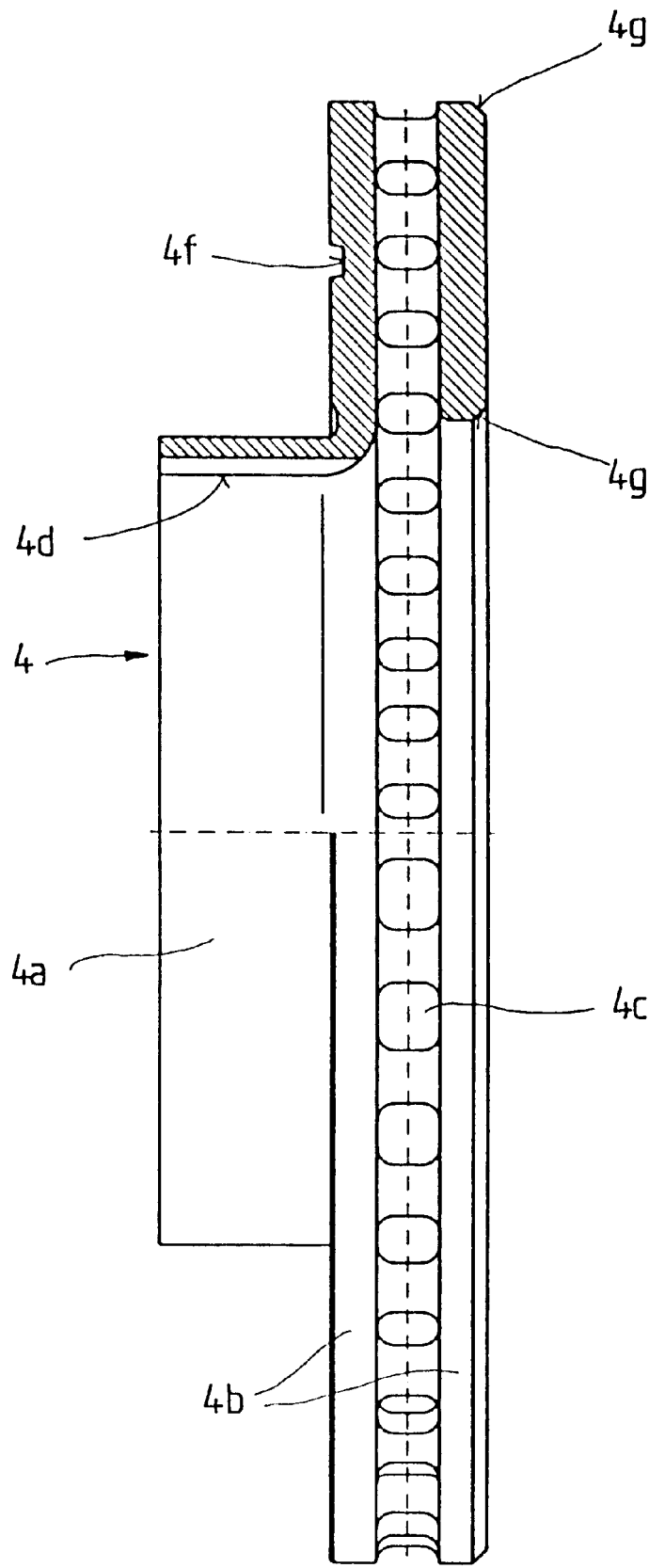
FIG. 9 a side view of the brake disk showing the upper half in section.

FIG. 9 shows a further embodiment for simplification of the brake disk change. The friction ring 4b of the brake disk 4 is provided at least at one friction end face with circumferential recesses 4f or circumferential slanted portions 4g at least within one portion of the circumference of the friction ring. The embodiment shown in FIG. 9 shows that the upper and lower edge of the inwardly positioned friction ring 4b is provided with slanted portions 4g and that in the central portion of the front friction ring 4b a cutout 4f is provided. When comparing the embodiment of the brake disk 4 of the FIG. 9 to that of FIG. 5, it is obvious that the slanted portions 4g and recesses 4f simplify removal of the brake disk 4 from the brake saddle support 6.

The specification incorporates by reference the disclosure of German priority document 196 52 694.9 of Dec. 18, 1996.

The present invention is, of course, in no way restricted to the specific disclosure of the specification and drawings, but also encompasses any modifications within the scope of the appended claims.

What is claimed is:

1. A method for changing a brake disk of a disk brake, wherein the brake disk is comprised of a friction ring and a brake disk hub for connecting the brake disk to a wheel hub that is rotatably connected to a steering knuckle and has a wheel flange for detachably connecting a wheel, wherein a brake saddle support has two brake pads with pad supports connected thereto, wherein the brake pads cooperate with the friction ring and wherein the brake saddle support is connected to a fastening flange of an axle body; said method comprising the steps of:

removing the wheel hub from the steering knuckle by separating the wheel hub from the brake disk hub of the position-secured brake disk;

removing the brake pads and the brake pad supports from the brake saddle support;

releasing the brake disk and lowering the brake disk onto the steering knuckle;

tilting an end of the brake disk opposite the brake saddle support toward a free end of the steering knuckle;

removing the brake disk from the brake saddle support and pulling the brake disk off the steering knuckle.

2. A method according to claim 1, wherein in the step of removing the wheel hub from the steering knuckle a wheel mounted to the wheel flange is removed together with the wheel hub.

3. A disk brake arrangement comprising:

a brake disk comprised of a friction ring and a brake disk hub for connecting the brake disk to a wheel hub that is rotatably connected to a steering knuckle and has a wheel flange for detachably connecting a wheel;

a brake saddle support having two brake pads with pad supports connected thereto;

said brake pads cooperating with said friction ring;

said brake saddle support connected to a fastening flange of an axle body;

wherein said friction ring has a radial width and an axial thickness matching a radial spacing between the steering knuckle and a forward end of said brake saddle support facing said wheel flange and matching an axial spacing between forward and rearward ends of said brake saddle support in order to allow lowering said brake disk onto the steering knuckle, tilting an end of said brake disk opposite said brake saddle support toward a free end of the steering knuckle, removing said brake disk from said brake saddle support, and pulling said brake disk off the steering knuckle;

wherein said brake disk hub has axial projections and axial recesses for interlocking said brake disk hub at a neck of the wheel hub in order to provide a rotationally fixed connection.

4. A disk brake arrangement according to claim 3, wherein said brake saddle support comprises two flanges and wherein said brake saddle support is attached by said two flanges to a fastening flange of the axle body, wherein said brake saddle support further comprises a front and a rear connecting stay connecting said two flanges, wherein said front and rear connecting stays form a receiving chamber for said brake pad supports, wherein said rear connecting stay has a centrally arranged axially recessed portion facing said brake disk.

5. A disk brake arrangement according to claim 4, wherein said recessed portion is formed by an arc-shaped cutout.

6. A disk brake arrangement according to claim 4, wherein said recessed portion is formed by a stepped cutout.

7. A disk brake arrangement according to claim 4, wherein said front connecting stay is narrower and higher than said rear connecting stay.

8. A disk brake arrangement according to claim 4, wherein a radial spacing of said front connecting stay to the steering knuckle is greater than a radial spacing of said rear connecting stay to the steering knuckle.

9. A disk brake arrangement according to claim 3, wherein at least one end face of said friction ring has a circumferential recess or a circumferential slanted portion extending at least over a portion of the circumference of said friction ring.

10. A disk brake arrangement according to claim 3, wherein said brake disk hub has an axial extension facing the wheel flange of the wheel hub.

\* \* \* \* \*